(12) United States Patent
Klau et al.

(10) Patent No.: US 8,572,711 B1
(45) Date of Patent: Oct. 29, 2013

(54) REAL IDENTITY VERIFICATION

(75) Inventors: Richard Parker Klau, San Ramon, CA (US); Kyrk Justin Lawyer, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/279,080

(22) Filed: Oct. 21, 2011

Related U.S. Application Data (60) Provisional application No. 61/405,361, filed on Oct. 21, 2010.

(51) Int. Cl.
*H04L 29/06* (2006.01)

(52) U.S. Cl.
USPC .................................... 726/9; 726/29

(58) Field of Classification Search
USPC .......................................... 726/9, 29
See application file for complete search history.

(56) References Cited

U.S. PATENT DOCUMENTS

| | | | |
|---|---|---|---|
| 7,591,413 B1 * | 9/2009 | Block et al. | 235/379 |
| 2003/0163708 A1 * | 8/2003 | Tang | 713/185 |
| 2010/0030698 A1 * | 2/2010 | Goodin | 705/76 |

OTHER PUBLICATIONS

Kobayashi, Tetsuji, Norifumi Machida, and Jaewook Kim. "The ID system using a cell phone with the verification and security." Jul. 13-16, 2010, In Industrial Informatics (INDIN), 2010 8th IEEE International Conference on, pp. 472-477.*

* cited by examiner

*Primary Examiner* — Kambiz Zand
*Assistant Examiner* — Michael Guirguis
(74) *Attorney, Agent, or Firm* — Patent Law Works LLP (57) ABSTRACT

A system for in-person identity verification comprises a computing device, an identity broker, a verifier system and a network. The user computing device sends a request for identity verification to the identity broker and it responds with a verification ticket including a unique identification number. The user presents the ticket to a clerk using the verifier system. The clerk inputs the unique identification number to the verifier system, the verifier system sends it to the identity broker and the identity broker sends user information that the verifier system presents to the clerk. The clerk compares the information to a photo government ID of the user and inputs whether the information presented by the user matches the information presented by the verifier, and whether the person is the person in the photo ID. Based on the clerk's input, the identity broker sends to the user computing device a message indicating whether the verification was confirmed or declined.

24 Claims, 10 Drawing Sheets

In person Method

Figure 5     Mail Method

Rick Klau Verify your name ⟵ 702          ⟵ 700

| Stream \ About \ Photos \

About me

I'm a tech entrepreneur who currently works at Google as the product manager on Google Profiles. I was previously a PM on Blogger, and before that I ran the publisher services team at FeedBurner prior to the acquisition by Google. I'm married, a father of 3 wonderful kids, and a political junkie.

My Links
- Twitter (verified)
- Facebook (verified)
- YouTube (verified)
- Foursquare (verified)
- Flickr Q Chat with Rick
✉ Email Rick
☏ Call Rick

Where I've Been

Acton, MA
Easton, PA
Richmond, VA
Bethel, CT
Washington, DC
Naperville, IL
Foster City, CA
San Ramon, CA

Information
Birthday:
October 26
Employer:
Google
Status:
Married t in ∞ f  view all Friends
(121) - see all

Where I've worked
Google: Product Manager, 2007 - present
FeedBurner: VP, Publisher Services, 2005 - 2007
Socialtext: VP, Business Development, 2004 - 2005
Interface Software: VP, Vertical Markets, 2001 - 2004
iManage: Director, Industry Marketing, 1999 - 2001
TrialNet: VP, Marketing & Development, 1997 - 1999

Where I went to school
University of Richmond, Lafayette College, L'Universite de Bourgogne Mutual Friends
(34) - See all

Contact info
Rick Klau has shared this contact information with you.
Add contact info to your own profile and specify which people can see it.

Email:  rick@rklau.com (Home)
        rklau@goole.com (Work)
Phone:  650-456-3215 (Google Voice)
Birthday: October 26

Figure 7

Google Name Verification ← 800 lorem ipsum dolor sit amet, consectetur adipisicing elit, sed do
eiusmod tempor incididunt ut labore et dolore magna aliqua.
pariatur. Excepteur sint occaecat cupidatat non
reprehenderit in voluptate velit esse cillum dolore eu fugiat nulla
proident, sunt in culpa qui officia deserunt mollit anim id est laborum.
nisi ut aliquip ex ea commodo consequat. Duis aute irure dolor in
Ut enim ad minim veniam, quis nostrud exercitation ullamco laboris
eiusmod tempor incididunt ut labore et dolore magna aliqua.
reprehenderit in voluptate velit esse cillum dolore eu fugiat nulla
pariatur. Excepteur sint occaecat cupidatat non  } 808

Option 1: In Person Verification

Click the button below to generate a unique code and
to find a Western Union location nearby.

1. Visit any Western Union location
2. provide them your unique code
3. present valid government-issued photo ID Your Profile will be marked as verified for all users to see.

[ Generate My Unique Code ] ─ 802

Option 2: Verification by Mail

Click the button below to have a postcard mailed to you.

1. Have us mail you a postcard
2. Enter unique code on postcard into verification form
Your Profile will be marked as verified for all users to
see.

[ Send me a postcard ] ─ 804

Option 3: Verification using your (Social Security #/country-relevant ID#)

Click the button below to provide your Social Security #/other ID #.

We do not store this #, it is used only for verification purposes

If the name and SS# match, your Profile will be marked as verified
for all users to see.

[ Enter My SS# ] ─ 806

Figure 8

Google Name Verification lorem ipsum dolor sit amet, consectetur adipisicing elit, sed do
eiusmod tempor incididunt ut labore et dolore magna aliqua.
pariatur. Excepteur sint occaecat cupidatat non
reprehenderit in voluptate velit esse cillum dolore eu fugiat nulla
proident, sunt in culpa qui officia deserunt mollit anim id est laborum.
nisi ut aliquip ex ea commodo consequat. Duis aute irure dolor in
Ut enim ad minim veniam, quis nostrud exercitation ullamco laboris
eiusmod tempor incididunt ut labore et dolore magna aliqua.
reprehenderit in voluptate velit esse cillum dolore eu fugiat nulla
pariatur. Excepteur sint occaecat cupidatat non       906

Option 1: In person Verification

In Person Verification

Your Unique Code: 01548840122-XRT

Find a Western Union Location:                904
    Country: United States
    Address:                      902

Bring this code to any Western Union location along
with photo ID to verify your name on your Profile.

Email this

Option 3: Verification using your (Social Security #/country-relevant ID#)

Click the button below to provide your Social Security #/other ID #.
We do not store this #, it is used only for verification purposes
If the name and SS# match, your Profile will be marked as verified for
all users to see.

Enter My SS#

Figure 9

Google Name Verification lorem ipsum dolor sit amet, consectetur adipisicing elit, sed do
eiusmod tempor incididunt ut labore et dolore magna aliqua.
pariatur. Excepteur sint occaecat cupidatat non
reprehenderit in voluptate velit esse cillum dolore eu fugiat nulla
proident, sunt in culpa qui officia deserunt mollit anim id est laborum.
nisi ut aliquip ex ea commodo consequat. Duis aute irure dolor in
Ut enim ad minim veniam, quis nostrud exercitation ullamco laboris
eiusmod tempor incididunt ut labore et dolore magna aliqua.
reprehenderit in voluptate velit esse cillum dolore eu fugiat nulla
pariatur. Excepteur sint occaecat cupidatat non

Option 1: In person Verification

Verification by Mail
We will mail you a postcard to the following address:

Address: 123 Main Street
Anytown, OH 12345
United States

Wrong address? Update it in your account settings and return here.

[Send me my postcard]

Your Unique Code: [          ] [Verify]

Option 3: Verification using your (Social Security #/country-relevant ID#)

We do not store this #, it is used only for verification purposes
If the name and SS# match, your Profile will be marked as verified for all users to see.

[Enter My SS#]

Figure 10

REAL IDENTITY VERIFICATION

This application claims the benefit of U.S. Provisional Application No. 61/405,361, entitled "Real Identity Verification" filed Oct. 21, 2010, the entire contents of which are herein incorporated by reference.

BACKGROUND

1. Technical Field

The present specification relates to a system and method verifying the identity of a user and in particular, the present specification relates to a system and method for real identity verification. The present specification relates to a system and method for multi-tier identity verification.

2. Background

With the growth of social networking, email and use of the internet generally there is a need to ensure that the users of accounts are who they say they are. Just as identity fraud is on the rise for conventional commercial transactions, it is also on the rise in the digital world. For example, there is an increase in the number of email account logins and passwords that are being stolen by keyloggers for account hijacking or takeover such as to send spam from those accounts. Similarly, fraud and unauthorized account use is also on the rise. Since many systems require only a login name and a simple password, the use of such system by imposters or a user other that the person that created the account is also on the increase.

SUMMARY

The deficiencies and limitations of the prior art are overcome at least in part by providing a system and method for identity verification. In particular, the present embodiments are a system and method that combines online and offline identity verification. In one embodiment, the system comprises a user computing device, an identity broker system, an identity verifier system and a network. The user computing device, the identity broker system and identity verifier system are coupled for communication with each other via the network. The user computing device sends a request for identity verification to the identity broker system and the identity broker system responds with a verification ticket including the unique identification number. The user takes a verification ticket along with independently issued identification information such as photo government ID (passport, driver's license, etc.) and presents the information to a clerk using the identity verifier system. The clerk inputs the unique identification number to the identity verifier system. The identity verifier system sends the unique identification number to the identity broker system, the identity broker system sends the identity verifier system information corresponding to the unique identification number that should be verified by the government ID (including legal name, etc). The identity verifier system then presents the information corresponding to the unique identification number to the clerk. The clerk performs a physical inspection of the information presented by the identity verifier system to the independently issued verification information (government photo ID, etc). The clerk inputs whether the information presented by the user matches the information presented by the identity verifier system. Based on the clerk's input, the identity broker system sends to the user computing device a message indicating whether the verification was confirmed or declined, and may also return the identification number of the government photo ID (e.g., passport, driver's license) that was used to perform the identity check. The present embodiments also include a number of novel methods for identity verification.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the embodiments.

BRIEF DESCRIPTION OF THE DRAWINGS

The embodiments are illustrated by way of example, and not by way of limitation in the figures of the accompanying drawings in which like reference numerals are used to refer to similar elements.

DETAILED DESCRIPTION

A system for identity verification is described below. In the following description, for purposes of explanation, numerous specific details are set forth in order to provide a thorough understanding of the embodiments. It will be apparent, however, to one skilled in the art that the embodiments can be practiced without these specific details. In other instances, structures and devices are shown in block diagram form in order to avoid obscuring the embodiments. One embodiment is described below with reference to specific examples. However, the embodiment applies to any type of computing systems that can perform the operation and functions described above.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. In particular the embodiments are described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The embodiment can take the form of an entirely hardware embodiment, an entirely software embodiment or an embodiment containing both hardware and software elements. A preferred embodiment is implemented in software, which includes but is not limited to firmware, resident software, microcode, etc.

Furthermore, an embodiment can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems appears from the description below. In addition, the embodiments are not described with reference to a particular programming language. It will be appreciated that a variety of programming languages may be used to implement the teachings as described herein.

System Overview

Figure 1:
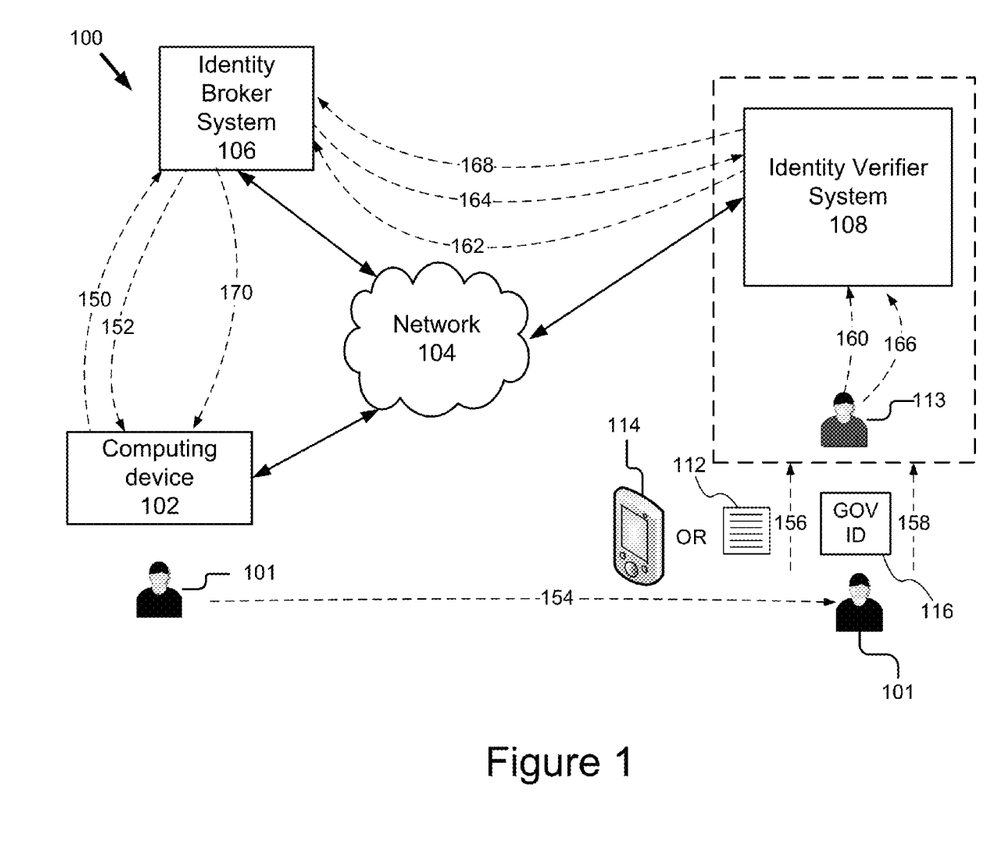
FIG. 1 is a block diagram of an embodiment of a system for identity verification.

Referring now to FIG. 1, a block diagram of an embodiment of a system 100 for identity verification is shown. The system 100 comprises a computing device 102, a network 104, an identity broker system 106, and an identity verifier system 108. In other embodiments, the system 100 includes a portable computing device 114. The computing device 102, the identity broker system 106 and the identity verifier system 108 are configured for communication via the network 104. This coupling allows the devices 102, 106, 108 to cooperate as is described below in more detail with reference to FIG. 1 and FIG. 4.

The computing device 102 is a conventional type such as personal computer, laptop computer, handheld computer, smart phone, or personal digital assistant. The computing device 102 is coupled to the network 104. In one embodiment, the computing device 102 can access and communicate with the identity broker system 106, and the identity verifier system 108 via the network 104. In one embodiment, the computing device 102 includes applications in a browser for communication via the Internet with the identity broker system 106. Although only a single computing device 102 for a single user is shown in FIG. 1, those skilled in the art will recognize that there may be thousands or even millions of computing devices 102 and millions of users communicating with the identity broker system 106 and the identity verifier system 108.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The identity broker system 106 is a system for communicating with the computing device 102 and the identity verifier system 108. The identity broker system 106 is described in more detail below with reference to FIG. 2A and FIG. 3A. Although not shown, in other embodiments, the identity broker system 106 is also coupled to social networks, e-mail servers, other data exchange systems for providing a profile that is usable for identity verification purposes. The identity broker system 106 is responsive to identity verification requests, generates unique identification codes, supplies identity information to the identity verifier system 108, receives identity confirmation and maintains and updates user profiles.

The identity verifier system 108 is a system for communicating with the identity broker system 106 and interfacing with a clerk 113. The identity verifier system 108 is described in more detail below with reference to FIG. 2B and FIG. 3B. In one embodiment, the identity verifier system 108 is a network of computing devices designed for exchanging information and presenting a defined process for the clerk 113 to execute. The identity verifier system 108 sends the unique identification code to the identity broker system 106, receives information from the identity broker system 106, present information to the clerk 113, accepts confirmation signals, and sends confirmation signals to the identity broker 106.

The portable computing device 114 is a conventional type such as a smart phone, a personal digital assistant, laptop, or handheld computer.

Identity Broker System 106

Figure 2A:
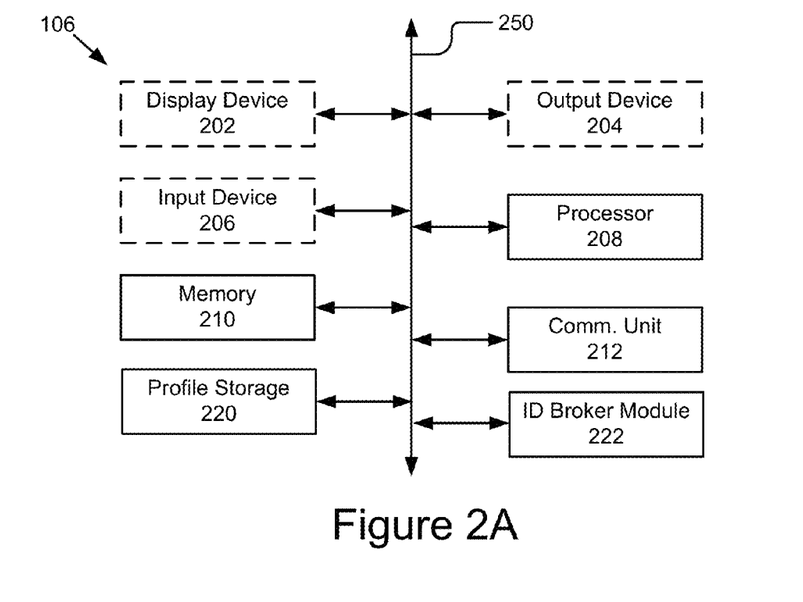
FIG. 2A is a block diagram of an embodiment of an identity broker system.

Referring now to FIG. 2A, a block diagram of an embodiment of the identity broker system 106 is shown in detail. The identity broker system 106 comprises a display device 202, an output device 204, an input device 206, a processor 208, a memory 210, a communication unit 212, profile storage to 220 and an ID broker module 222. These components are coupled for communication with each other via a bus 250. Some of these components are optional and are shown with dashed lines in FIG. 2A.

The display device 202 is a conventional type such as a liquid crystal display (LCD) or any other similarly equipped display device, screen, or monitor. The display device 202 represents any device equipped to display electronic images and data as described herein. The output device 204 and an input device 206 are conventional types. The output device 204 can include speakers or other conventional output device. The input device 206 is a QWERTY keyboard and a mouse-type controller. The input device 206 may also include a microphone, a web camera or similar audio or video capture device.

The processor 208 comprises an arithmetic logic unit, a microprocessor, a general purpose controller or some other processor array to perform computations, provide electronic display signals to display device 202. The processor 302 is coupled to the bus 250 for communication with the other components of the identity broker system 106. Processor 208 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The identity broker system 106 also includes an operating system executable by the processor such as but not limited to WINDOWS®, MacOS X, Android, or UNIX® based operating systems.

The memory 210 stores instructions and/or data that may be executed by processor 208. The instructions and/or data comprise code for performing any and/or all of the techniques described herein. The memory 210 may be a dynamic random access memory (DRAM) device, a static random access memory (SRAM) device, flash memory or some other memory device known in the art. In one embodiment, the memory 210 also includes a non-volatile memory such as a hard disk drive or flash drive for storing log information on a more permanent basis. The memory 210 is coupled by the bus 250 for communication with the other components of the identity broker system 106.

The communication unit 212 is coupled to bus 250 and provides a port for direct physical connection to the network 104. The communication unit 212 includes a transceiver for sending and receiving information. In one embodiment, the communication unit 212 includes a Wi-Fi transceiver for wireless communication with an access point. In another embodiment, the communication unit 212 includes a Bluetooth® transceiver for wireless communication with other devices. In yet another embodiment, the communication unit 212 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 212 includes ports for wired connectivity such as but not limited to USB, SD, or CAT-5, etc. The communication unit 212 links the processor 208 to the network 104 that may include multiple processing systems. The network of processing systems may comprise a local area network (LAN), a wide area network (WAN) (e.g., the Internet), and/or any other interconnected data path across which multiple devices may communicate. The communication unit 212 also provides other conventional connections to the network 104 for distribution of files (media objects) using standard network protocols such as TCP/IP, HTTP, HTTPS and SMTP as will be understood to those skilled in the art.

The profile storage 220 is coupled to the ID Broker module 220 to receive information from a user that becomes part of the user's profile and to receive confirmation that the identity of the user has been verified. The profile storage 220 is a non-volatile memory device or similar permanent storage device and media. The profile storage 220 stores data and instructions for processor 208 and comprises one or more devices including a hard disk drive, a floppy disk drive, a CD-ROM device, a DVD-ROM device, a DVD-RAM device, a DVD-RW device, a flash memory device, or some other mass storage device known in the art. The profile storage 220 is used to store user profiles and other information about the user for verifying the identity of the user.

The ID broker module 222 communicates over bus 250 with the other components of the identity broker system 106. The ID broker module 222 provides logic and instructions for, responsive to an identity verification requests, generating a unique identification codes, supplying identity information to the identity verifier system 108, receiving identity confirmation and maintaining and updating user profiles. In one embodiment, the ID broker module 222 is implemented in hardware (e.g., in an FPGA), as illustrated in FIG. 2A. In another embodiment, the ID broker module 222 can include software routines and instructions that are stored, for example, in memory 210 and executable by the processor 208. Details describing the functionality and components of the ID broker module 222 will be explained in further detail below with regard to FIG. 3A.

As is known in the art, the identity broker system 106 can have different and/or other components than those shown in FIG. 2A. In addition, the identity broker system 106 can lack certain illustrated components. In one embodiment, the identity broker system 106 lacks an input device 206, output device 204, and/or display device 202. Moreover, the profile storage 220 can be local and/or remote from the identity broker system 106 (such as embodied within a storage area network (SAN)).

As is known in the art, the identity broker system 106 is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored in the memory 210, and executed by the processor 208.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

ID Broker Module 222

Figure 3A:
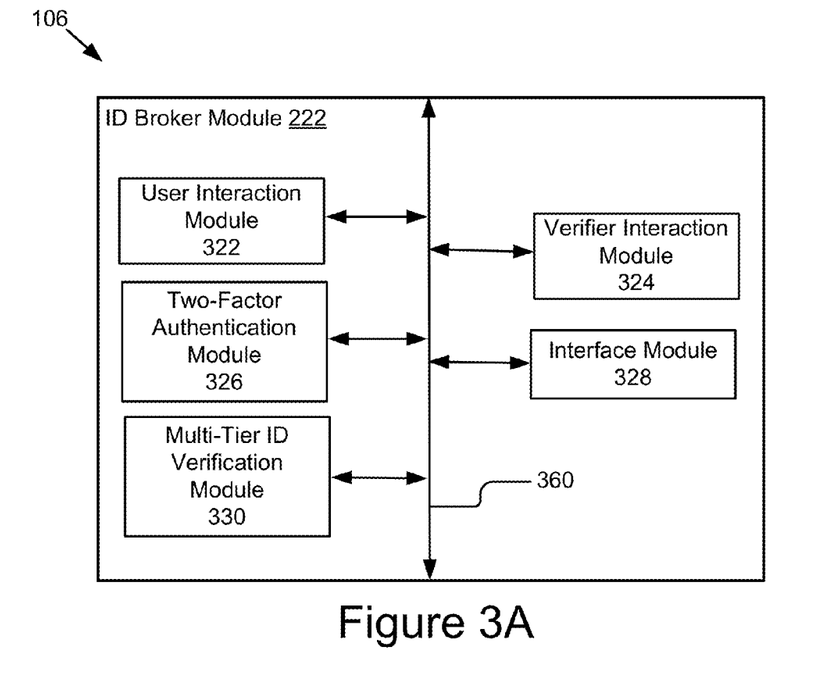
FIG. 3A is a block diagram of an embodiment of an ID broker module.

FIG. 3A is a block diagram illustrating the ID broker module 222 according to one embodiment. The ID broker module 222 is software and routines executable by the processor 208 for, responsive to an identity verification requests, generating a unique identification codes, supplying identity information to the identity verifier system 108, receiving identity confirmation and maintaining and updating user profiles. In one embodiment, the ID broker module 222 is a set of instructions executable by the processor 208 to provide the functionality described below for, responsive to an identity verification requests, generating a unique identification codes, supplying identity information to the identity verifier system 108, receiving identity confirmation and maintaining and updating user profiles. In another embodiment, the ID broker module 222 is stored in the memory 210 of the identity broker system 106 and is accessible and executable by the processor 208. In either embodiment, the ID broker module 222 is adapted for cooperation and communication with the processor 208 and other components of the identity broker system 106.

In the illustrated embodiment, the ID broker module 222 includes a user interaction module 322, a verifier interaction module 324, a two-factor authentication module 326, an interface module 328 and a multi-tier ID verification module 330. However, in other embodiments, the ID broker module 222 includes different and/or additional modules than the ones depicted in FIG. 3A. The components of the ID broker module 222 are coupled to each other, the processor 208 and the components of identity broker system 106 via signal line 250.

In one embodiment, the modules are implemented using instructions and/or data included in the memory 210, in another embodiment, the modules are implemented using one or more hardware devices configured to provide the functionality further described below. For example, the modules are implemented using one or more application specific integrated circuits (ASICs) and/or one or more field programmable gate arrays (FPGAs) coupled via signal line 360, acting as a bus 250, configured to provide the functionality of the modules further described below.

The user interaction module 322 is software and routines executable by the processor 208 that manages and controls the communication between the identity broker system 106 and the computing device 102. The user interaction module 322 generates and presents user interfaces displayable by the computing device 102 for the input of user information and the verification of identity, which may become part of the user's profile stored in the profile storage 220. Example user interfaces are described below with reference to FIGS. 6-10. The operation of the user interaction module 322 is described below in more detail with reference to FIGS. 1, 4 and 5.

The verifier interaction module 324 is software and routines executable by the processor 208 to control the interaction between the identity broker system 106 and the identity verifier system 108. The verifier interaction module 324 receives the unique identification code from the identity verifier system 108, verifies the unique identification code and sends information corresponding to the unique identification code back to the identity verifier system 108. The verifier interaction module 324 also receives a confirmation or denial signal from the identity verifier system 108 and updates the user profiles stored in the profile storage 220 accordingly.

The two-factor authentication module 326 is software and routines executable by the processor 208 to perform two-factor authentication. In one embodiment, the two-factor authentication module 326 performs the two-factor authentication and cooperates with user interaction module 322 for receiving and sending information necessary to perform the authentication. In another embodiment, the two-factor authentication module 326 is merely an interface to systems and external to the identity broker system 106 that perform two-factor authentication. The two-factor authentication module 326 also communicates and cooperates with the multi-tier ID verification module 330 as a selectable option.

The interface module 328 is software and routines executable by the processor 208 that allow the identity broker system 106 to communicate with other systems such as but not limited to social network servers, e-mail servers, telephony servers, document management servers, and other data exchange platforms. The interface module 328 allows the identity broker system 106 to share identity verification information with other systems. More particularly, the interface module 328 allows third party systems to verify the identity of the user accessing the user profiles stored in the identity broker system 106. In one embodiment, the interface module 328 is used to allow third parties to access the identity broker system 106 and use the identity broker system 106 as a trusted platform provider of credentials associated with a real name across the web such as in accordance with the OpenID protocol.

The multi-tier ID verification module 330 is software and routines executable by the processor 208 that allow the identity broker system 106 to provide different levels of identity verification. For actions that are more damaging in the event a password is compromised, higher levels of authentication could be required before allowing those actions to be completed. For example, password changes, completing high dollar financial transactions, or any high risk action where it is unclear to the hosting system that the user really is who they say they are, the present embodiment requires one of the higher levels of authentication, including simultaneous second factor authentication. For example, in one embodiment the identity broker system 106 provides three levels of identity verification as specified in Table 1 below.

TABLE 1

| Level Of Identity Verification | Real Identity Verification | Two-factor Identity Verification | Login & Password |
|---|---|---|---|
| High | X | X | X |
| Medium | X | | X |
| | | X | X |
| Low | | | X |

At the first or the highest level of identity verification, the identity of the user is verified by real identity verification as is described below, two-factor identity verification and a login password. In a second or medium level of verification, the identity of the user is verified either 1) with real identity verification and a login and password, or 2) second factor authentication and a login and password. For a third or lowest level of verification, the identity of the user is verified only with a login and password. Those skilled in the art will recognize that the three tiers described above are merely by way of example both in the number of tiers and the types of verification. There may be a variety of additional tiers or as few as two tiers. Furthermore, other types of verification of identity may be added, subtracted or substituted in any of the different verification levels. For example, verification using the Social Security number or other user specific identity information can be input and confirmed against a third-party database. The multi-tier ID verification module 330 interacts with the user interaction module 322 to offer different levels identity verification and perform the verification process according to level. The multi-tier ID verification module 330 also interacts with third party systems via the interface module 328 to provide different levels of verification. The multi-tier ID verification module 330 is coupled to the profile storage 220 to receive and store identity verification information corresponding to the information received from the verification interaction module 324 or the two-factor authentication module 326. The multi-tier ID verification module 230 is coupled to signal line 360 for communication with the other modules of the identity broker system 106.

Identity Verifier System 108

Figure 2B:
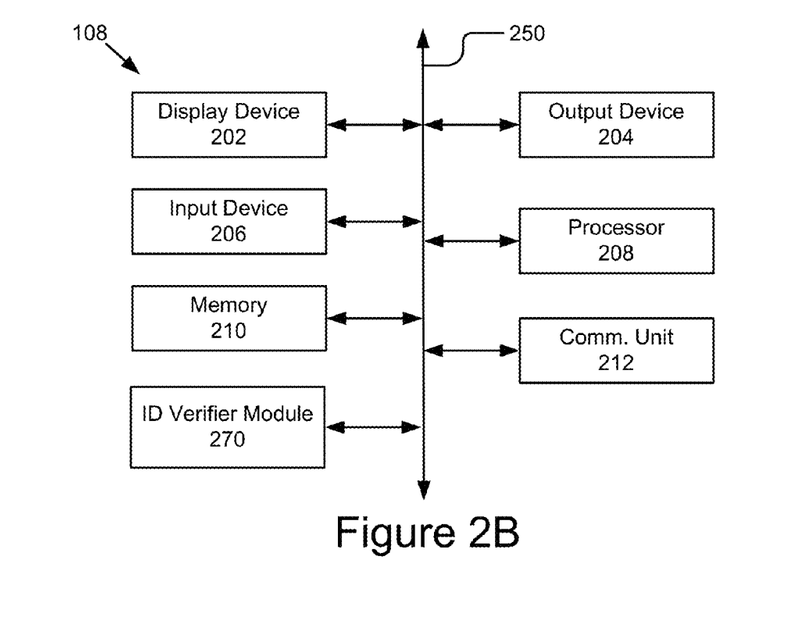
FIG. 2B is a block diagram of an embodiment of an identity verifier system.

Referring now to FIG. 2B, a block diagram of an embodiment of the identity verifier system 108 is shown in detail. The illustrated identity verifier system 108 comprises a display device 202, an output device 204, an input device 206, a processor 208, a memory 210, a communication unit 212 and an ID verifier module 270. The display device 202, the output device 204, the input device 206, the processor 208, the memory 210, the communication unit 212, bus 250 have been described above so that description is not repeated here. Like reference numbers have been used for like components with the same or similar functionality.

The ID verifier module 270 communicates over bus 250 with the other components of the identity verifier system 108. The ID verifier module 270 provides logic and instructions for communicating with the identity broker system 106 and interfacing with a clerk 113. In one embodiment, the ID verifier module 270 is implemented in hardware (e.g., in an FPGA), as illustrated in FIG. 2B. In another embodiment, the ID verifier module 270 can include software routines and instructions that are stored, for example, in memory 210 and executable by the processor 208. Details describing the functionality and components of the ID verifier module 270 will be explained in further detail below with regard to FIG. 3B.

As is known in the art, the identity verifier system 108 can have different and/or other components than those shown in FIG. 2B. In addition, the identity verifier system 108 can lack certain illustrated components.

As is known in the art, the identity verifier system 108 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored in the memory 210, and executed by the processor 208.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Furthermore, while shown in FIG. 2B as a single computer server, those skilled in the art should recognize that the identity verifier system 108 can be a network of distributed computing systems such as owned or operated by a financial institution or government agency. One embodiment requires that the identity verifier system 108 and the clerk 113 are capable of reviewing and comparing government IDs and confirming the person who presented the ticket does in fact have the name given by the identity broker system 106 as proven by the government ID. For example, in one embodiment, the identity verifier system 108 represents the computer network of a financial institution, bank, governmental office, or some other trusted set of businesses or notaries such as a wire transfer service with franchise locations around the world, or other similar entity with branch offices in cities around the world and a trusted network of agents throughout the world.

ID Verifier Module 270

Figure 3B:
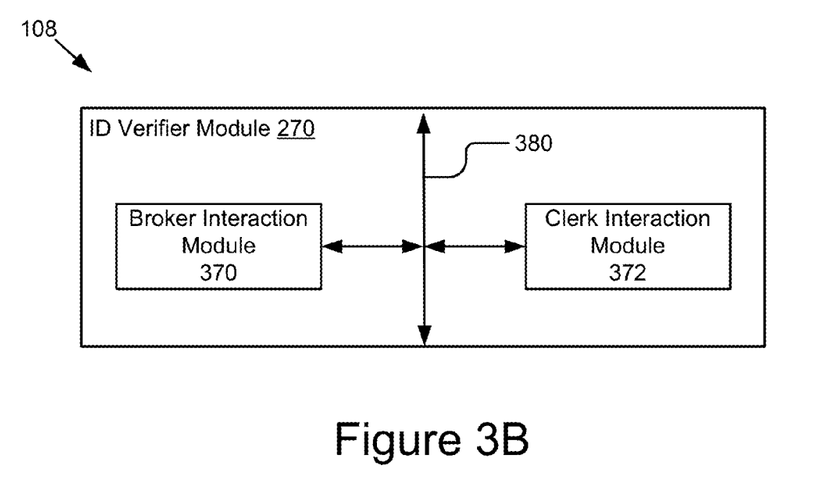
FIG. 3B is a block diagram of an embodiment of an ID verifier module.

FIG. 3B is a block diagram illustrating the ID verifier module 270 according to one embodiment. The ID verifier module 270 is software and routines executable by the processor 208 for communicating with the identity broker system 106 and interfacing with a clerk 113. In one embodiment, the ID verifier module 270 is a set of instructions executable by the processor 208 to provide the functionality described below for communicating with the identity broker system 106 and interfacing with a clerk 113. In another embodiment, the ID verifier module 270 is stored in the memory 210 of the identity verifier system 108 and is accessible and executable by the processor 208. In either embodiment, the ID verifier module 270 is adapted for cooperation and communication with the processor 208 and other components of the identity verifier system 108.

In the illustrated embodiment, the ID verifier module 270 includes a broker interaction module 370 and a clerk interaction module 372. However, in other embodiments, the ID verifier module 270 includes different and/or additional modules than the ones depicted in FIG. 3B. The components of the ID verifier module 270 are coupled to each other, the processor 208 and the components of identity verifier system 108 via signal line 380.

In one embodiment, the modules are implemented using instructions and/or data included in the memory 210, in another embodiment, the modules are implemented using one or more hardware devices configured to provide the functionality further described below. For example, the modules are implemented using one or more application specific integrated circuits (ASICs) and/or one or more field programmable gate arrays (FPGAs) coupled via signal line 380, acting as a bus 250, configured to provide the functionality of the modules further described below.

The broker interaction module 370 is software and routines executable by the processor 208 to facilitate communication and data exchange between the identity verifier system 108 and the identity broker system 106. In particular, the broker interaction module 370 communicates and interacts with the verifier interaction module 324 of the identity broker system 106. The broker interaction module 370 sends unique identification codes received from the clerk interaction module 372 to the identity broker system 106. The broker interaction module 370 also receives user profile information necessary to verify the identity of a user. The broker interaction module 370 sends user profile information to the clerk interaction module 372 for presentation to the clerk 113. The broker interaction module 370 manages the association of unique identification codes to information received from the identity broker system 106. The broker interaction module 370 also sends a confirmation or denial of verification to the identity broker system 106. The operation of the broker interaction module 370 is described in more detail below with reference to FIGS. 1 and 4 below.

The clerk interaction module 372 is software and routines executable by the processor 208 for presenting information to the clerk via the display device 202 an output device 204 and receiving input from the clerk via the input device 206. In particular, the clerk interaction module 372 cooperates with the input device 206 to receive a unique identification code entered by the clerk. The clerk interaction module 372 cooperates with the broker interaction module 370 to send this information to the identity broker system 106. The clerk interaction module 372 also cooperates with the broker interaction module 370 to present user information and instructions for the clerk on the display device 202. The operation of the clerk interaction model 372 is described in more detail below with reference to FIGS. 1 and 4.

Methods and User Interfaces 108

Figure 4:
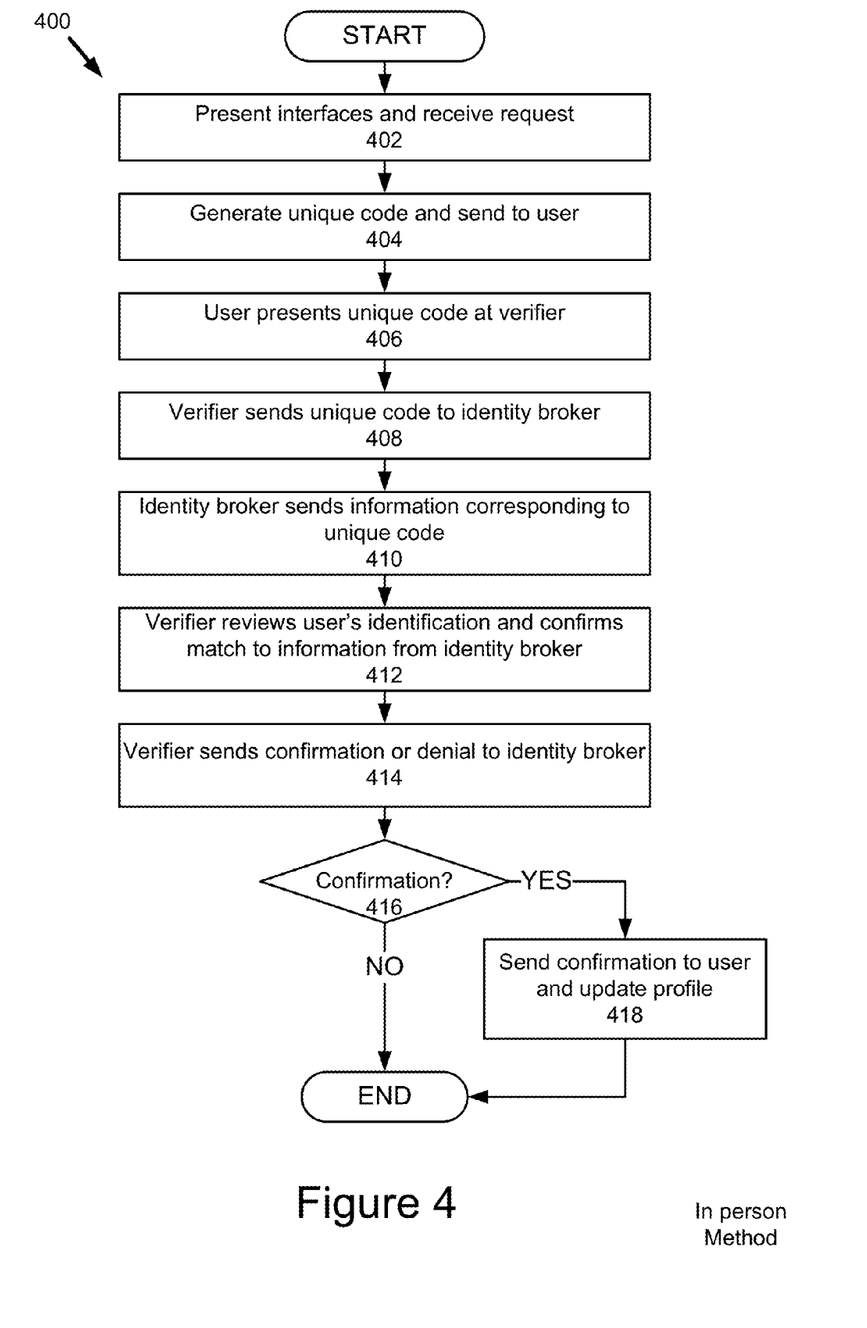
FIG. 4 is a flow chart illustrating an embodiment of a method for identity verification.

Referring now to FIGS. 1 and 4, an embodiment of a method for real (in person) identity verification is described. FIG. 1 shows various steps of the method of one embodiment with dashed and numbered lines. FIG. 4 is a flow chart of the steps in the method according to one embodiment. In addition, reference is made to the various user interfaces generated by different components of the system 100 as depicted in FIGS. 6-10.

Figure 6:
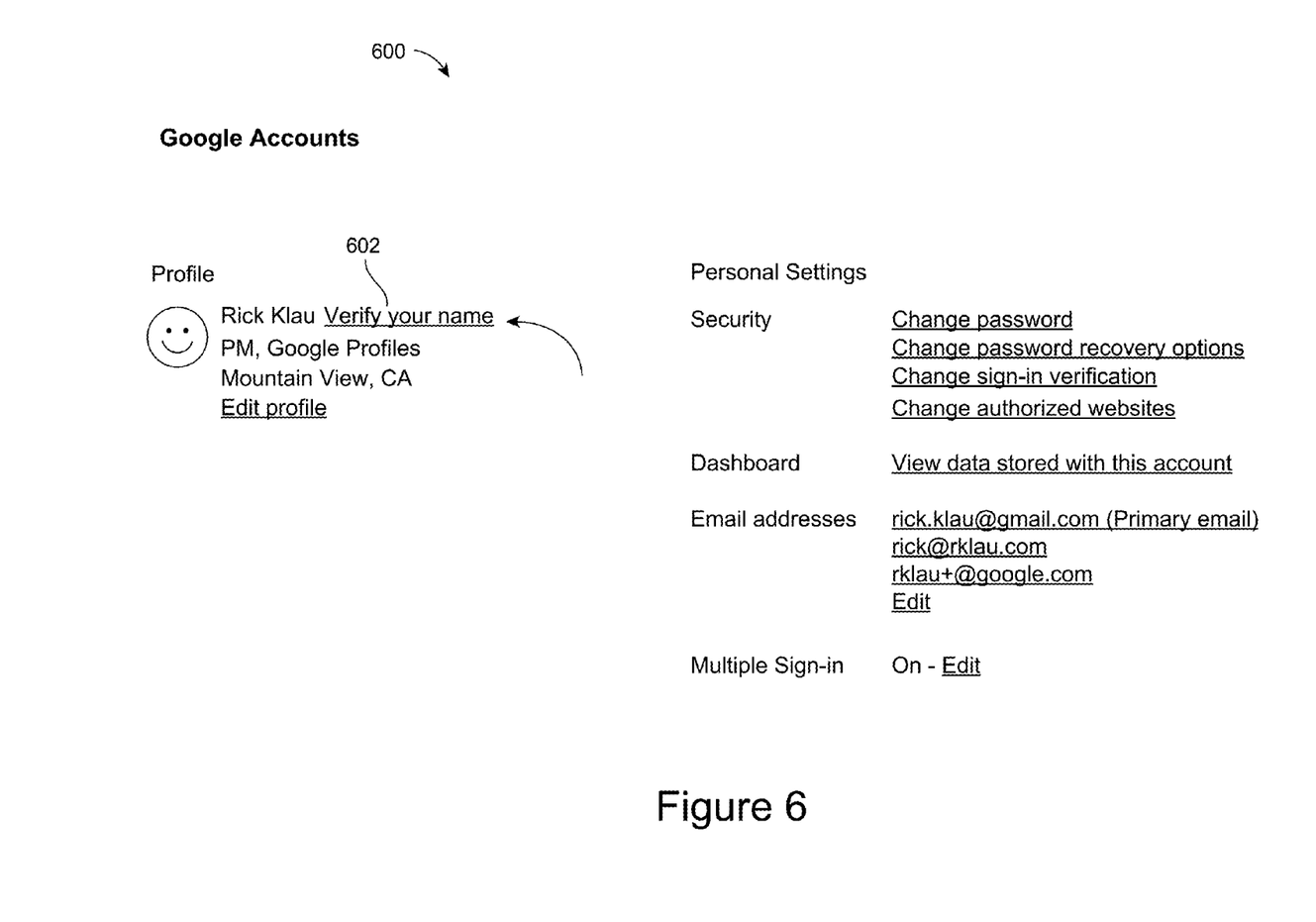
FIG. 6 is a graphic representation of one embodiment of a user interface for displaying a user's account information.
Figure 7:
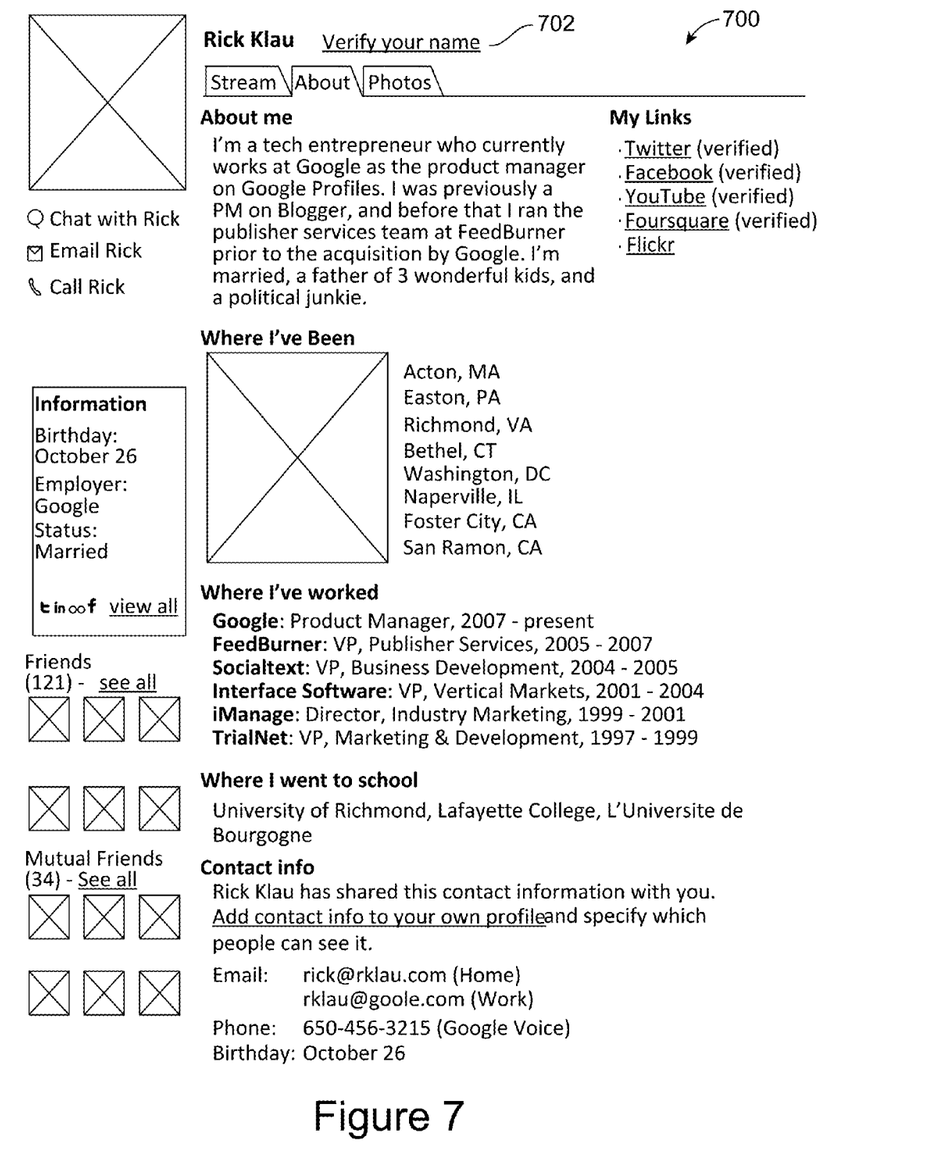
FIG. 7 is a graphic representation of one embodiment of a user interface for displaying profile information.

The identity verification method begins with the user accessing one of the user's accounts and an interface 600, 700 being presented 402 such as in a web browser on the computing device 102. An example user interface 600 for accessing and interacting with user accounts to modify a user's profile and personal settings is shown in FIG. 6. The user begins name verification by clicking on a link 602 as shown in FIG. 6. In another example, a profile interface 700 from a social network for the user has a similar link 702 that may be selected by the user.

Figure 8:
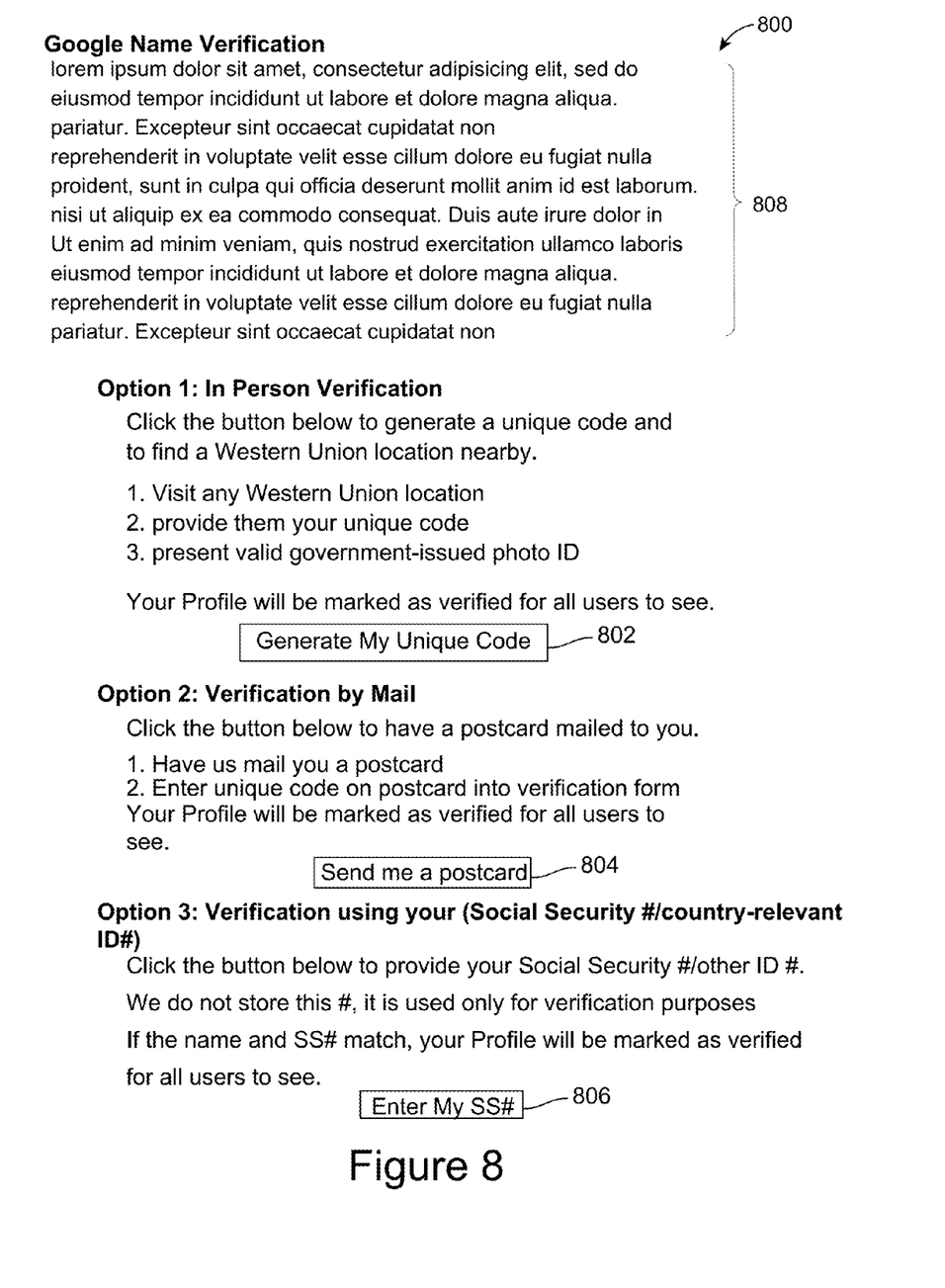
FIG. 8 is a graphic representation of one embodiment of a user interface for verifying a user's identity.

In response to selection of either link 602 or 702, the identity broker system 106 presents 402 another interface 800 that allows the user to select the type of name verification the user desires to perform. The present embodiment advantageously provides a variety of different types of identity verification that can be performed on the user. These various types of identity verification are used to establish the level of identity verification that has been performed by the user and allows for the multi-tier identity verification described above. The example user interface shown in FIG. 8 is merely one example that provides three options for verification. Each of the different types of verification is explained and a user selectable button 802, 804, 806 is provided for the user to initiate one of the different types of verification. Those skilled in the art will recognize that the examples shown in FIG. 8 are merely examples in a variety of other types of identity verification such as but not limited to name/address lookups, postcard mailers, phone verification, directory lookups, and other types of identity verification could also be used.

Figure 9:
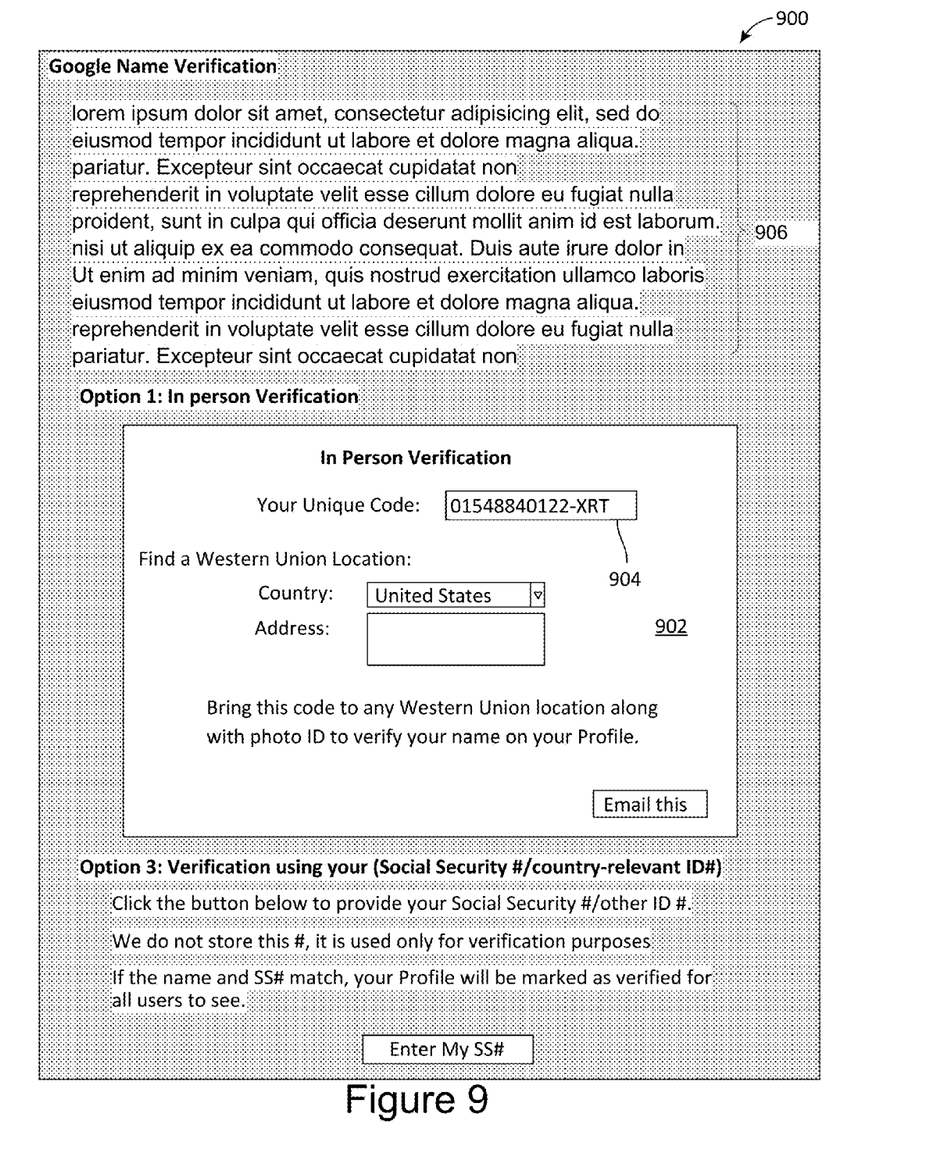
FIG. 9 is a graphic representation of one embodiment of a user interface for in person verification.

FIG. 8 illustrates a graphic representation of one embodiment of a user interface for verifying a user's identity. FIG. 8 includes interface 800 that allows the user to select the type of name verification the user desires to perform. Interface 800 includes an area 808, where, in some embodiments, marketing text is displayed explaining the verification process. In response to the selection of the "generate my unique code" button 802 by the user, the system 100 begins the process of identity verification and a request is sent 150 (see FIG. 1) from the computing device 102 to the identity broker system 106. Similarly, if the other buttons 804, 806 are selected the identity verification process is initiated for verification by mail and verification using a government issued identification number, respectively. In one embodiment, the method also checks to determine whether the profile that exists for the user already has information that is required to confirm the person's identity in person. For example, information such as full name, address, citizenship, phone number, gender, ID card number, etc. If this information does not exist, the identity broker system 106 presents a user interface that allows the user to input the information to the system 100. This information is later used by the person that performs in-person identity verification (the "clerk 113") to confirm that this information matches the information on the ID presented for verification. The request is received 402 at the identity broker system 106. In response, the identity broker system 106 generates 404 a unique identification code for this verification transaction and sends it to the computing device 102 of the user. This is represented in FIG. 1 by step 152. In one embodiment, when the user selects the in-person verification option, the system 100 presents a modal box 902 with the unique identification code 904 that was generated for this user. In one embodiment, the unique identification code 904 is time-limited (e.g., usable within a predefined time of generation such as 5 days.). FIG. 9 illustrates one embodiment of a user interface 900 showing the modal box 902 and the unique identification code 904. In the example embodiment, the user interface 900 includes an address and/or zip code lookup allowing the user to find a location of an identity verifier system 108 nearby and e-mails the user the locations they selected, the unique identification code, and instructions for completing the verification process in person. The user interface 900 also includes area 906 displaying marketing text explaining the verification process. In another embodiment, the system 100 generates a printable ticket such as in PDF form or as a printable webpage and the user can print the ticket. Next, the user takes the ticket 112 or e-mail and physically travels to the location of the identity verifier system 108. This is represented by line 154 in FIG. 1 and the user moving from the computing device to the identity verifier system 108.

Once the user 101 has traveled to the location of the identity verifier system 108, the user 101 interacts with a clerk 113. One embodiment requires that the identity verifier system 108 and the clerk 113 are capable of reviewing and comparing government IDs and confirming the person who presented the ticket does in fact have the name given by the identity broker system 106 as proven by the government ID. For example, the clerk 113 may be a representative of a financial institution, bank, governmental office, or some other trusted set of businesses or notaries that performs wire transfers or a representative of a wire transfer service with franchise locations around the world, or a representative of bank or other similar entity with branch offices in cities around the world. The user 101 presents 406 the unique identification code to the clerk 113 at the identity verifier system 108 (156 in FIG. 1). In one embodiment, the user 101 has a piece of paper or ticket 112 with the unique identification code thereon, and the ticket is presented to the clerk. In another embodiment, the user has an e-mail message with the unique identification code that is displayable on a portable computing device 114 and the screen of that device is shown to the clerk 113. The user 101 also provides the clerk 113 with the user's photo identification 116 such as a government issued passport or driver's license (158 in FIG. 1). The clerk 113 inputs (160 in FIG. 1) the unique identification code into the identity verifier system 108. In one embodiment, the identity verifier system 108 is running an application provided by the identity broker system 106 that presents information responsive to the input of a unique identification code. The identity verifier system 108 sends 408 the unique identification code to the identity broker system 106 (162 in FIG. 1). The identity broker 106 retrieves information corresponding to the unique identification code and sends 410 the information corresponding to the unique identification code to the identity verifier system 108 (164 and FIG. 1). This information corresponding to the unique identification code is a subset of information from the user's profile that is necessary to allow the clerk 113 to verify the identity of the user. For example, this subset of information may include the exact name of the user, a photo of the user, the address of the user, and ID card number, etc. The clerk 113 of the identity verifier system 108 reviews the user's identification and confirms 412 that it matches the information corresponding to the unique identification code received from the identity broker system 106. For example, the clerk 113 compares the picture on the government issued ID to the user 101 presenting it, compares the information on the government ID such as name, address, gender and government ID number to the information received from the identity broker system 106. In another embodiment, the clerk 113 may also capture a picture of the user that is presenting the government ID 116 or trying to confirm his/her identity. Next, the clerk 113 inputs into the identity verifier system 108 whether the information provided from the identity broker system 106 matches with the government ID of the user (166 in FIG. 1). In one embodiment, this is a simple binary input of either verified or denied. The confirmation or denial signal is sent 414 from the identity verifier system 108 to the identity broker system 106 (168 in FIG. 1). Finally, the identity broker system 106 determines 414 whether the identity was confirmed. If not, the method is complete and ends. If the identity of the user was verified by the identity verifier system 108, the method continues by sending 418 a confirmation e-mail to the user and updating the user's profile stored in the profile storage 220 (170 in FIG. 1). In one embodiment, the identity brokers system 106 also displays a visual representation such as a "verified name" stamp on the user profile with a call out to explain that this individual was verified in person by the identity verifier system 108.

Figure 5:
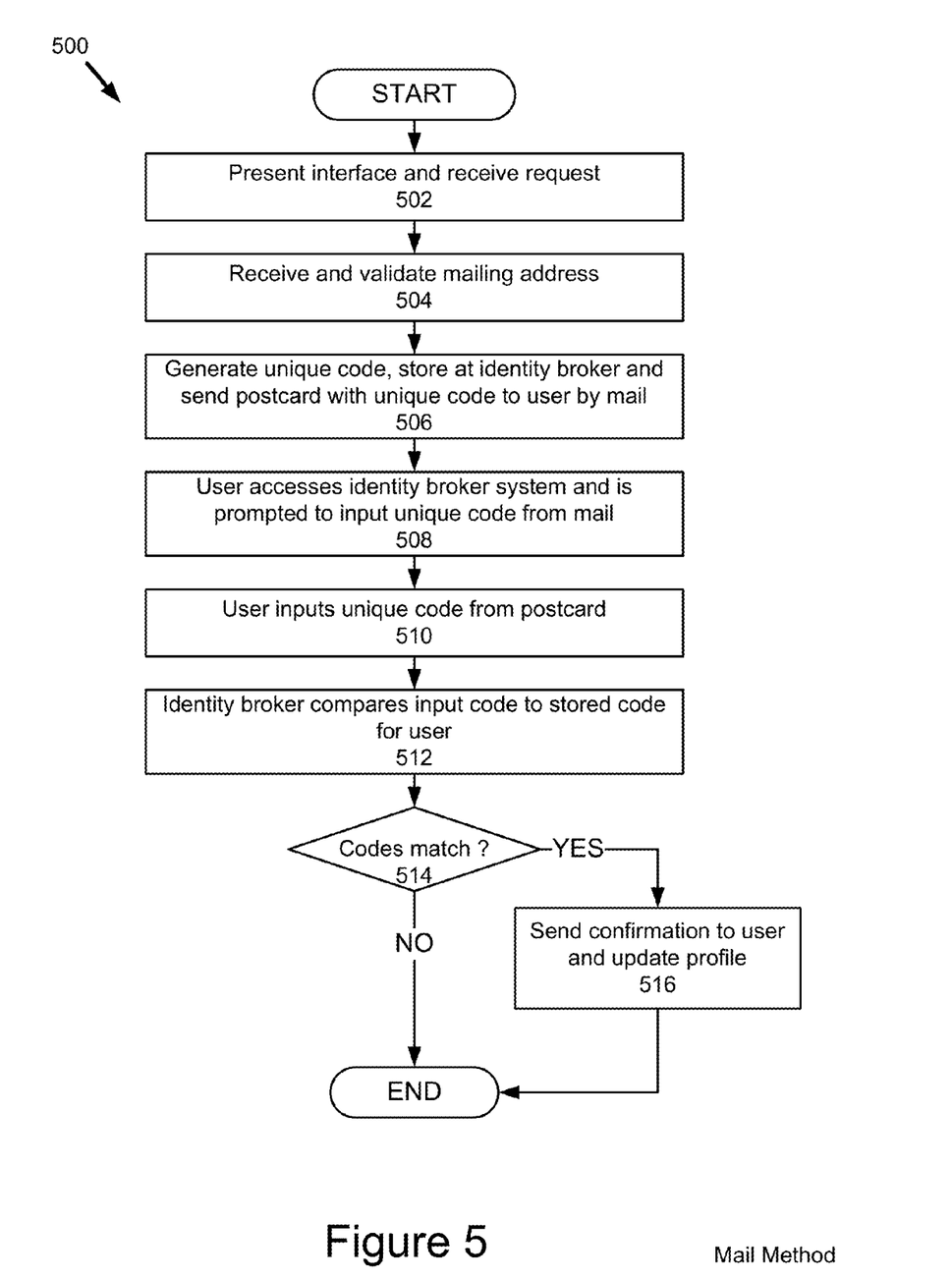
FIG. 5 is a flow chart illustrating a second embodiment of a method for identity verification.

Referring now to FIG. 5, a method for performing identity verification by mail is described in more detail. For many countries, the identity broker system 106 includes or has access to a database of names and addresses. Users choosing this verification by mail method must first provide an address through a profile editor. If the provided address matches an address the identity broker system 106 independently obtained in the broker system 106 for the user's name, the user can have a postcard mailed to his/her address which includes a unique identification code. Upon receipt, the user enters that unique identification code into the Profile Editor, receiving a "verified" label on his/her Profile.

Figure 10:
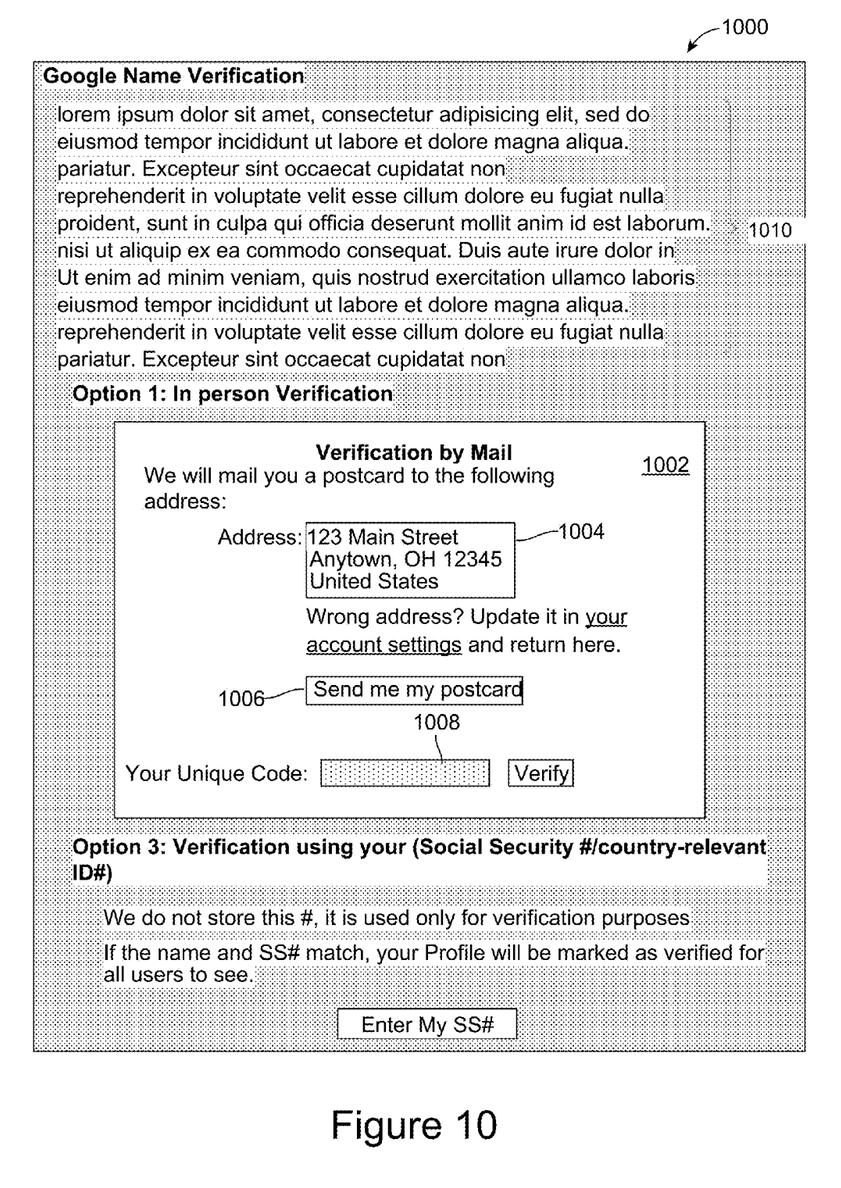
FIG. 10 is a graphic representation of one embodiment of a user interface for verification by mail.

The method begins similar to that described above for in person verification with the presentation of interfaces 600, 700, 800 and 1000 and receiving 502 a request. More specifically, links 602, 702 to access the name verification interface 800 are presented and the user navigates to the name verification interface 800. However, when presented with the name verification interface 800, the user selects verification by mail by depressing button 804. In response, the identity broker system 106 generates and presents a verification by mail interface 1000. An example of one embodiment for the verification by mail interface 1000 is shown in FIG. 10. The verification by mail interface 1000 includes a modal box 1002, a field 1004 for inputting the mailing address of the user, a button 1006 for requesting a postcard and an input box for providing a unique identification code. The user interface 1000 also includes area 1010 displaying marketing text explaining the verification process. In one embodiment, the input box is grayed out until the postcard is sent. Upon selecting verification by mail, a user is asked to add a home address if one has not already been provided. The field 1004 of the verification by mail interface 1000 is provided for this purpose. Once the user inputs his/her mailing address, the system 100 receives and validates 504 the mailing address. The one embodiment, the identity broker system 106 queries a third-party to confirm a name/address match. If a match is found, the method continues by generating and presenting a button 1006 with the option of initiating a postcard mailer that mails a unique identification code to the user. If the user selects the "send the postcard" button 1006, the system continues by generating unique identification code, storing the unique identification code at the identity broker system 106 and sending 506 the postcard with the unique identification code to the user by mail. In one embodiment, the identity broker system 106 also sends an e-mail to the user confirming that the identity verification postcard has been mailed. The user receives the postcard, and accesses 508 the verification by mail interface 1000. The user is prompted 508 to input the unique identification code from the postcard. The user inputs 510 the unique identification code from the postcard into the "your unique code" box 1008 using computing device 102 which in turn sends the unique identification code to the identity broker system 106. The identity broker system 106 compares 512 the input unique identification code to the stored unique identification code for the user and determines 514 whether there is a match. If not, the method is complete and ends. If the input unique identification code and the stored unique identification code match, the identity of the user is verified and the method completes by sending 516 a confirmation e-mail to the user and updating the user's profile stored in the profile storage 220.

As part of a multi-tier identity verification process, the present embodiment also includes a method for verifying a user's identity by submitting his/her Social Security number or other equivalent government issued identification number. For select countries, the identity broker system 106 contracts with third parties to facilitate name/Social Security number validation. Users would be asked to enter in his/her Social Security number (or equivalent government ID number), and the identity broker system 106 queries the third party for the user's country to establish whether the name and number as provided match the information validated by the third party. This option requires the user to provide his/her full given name and government-issued ID number. In one embodiment, the identity broker system 106 performs a real-time lookup against the third party service providing verification services for the individual's home country. In one embodiment, the verification by Social Security number interface of FIG. 8 is only presented in situations in which the identity broker system 106 is able to perform such verification. For example, there may be countries in which such verification is not possible or countries for which the identity broker system 106 does not have contractual arrangements to verify such information. In general, the process for verifying a user's identity using his/her Social Security number is as follows. First, the user confirms the full name is correct in his/her account settings and is prompted to enter his/her Social Security number or identification number for the country. If the information is not correct the user can proceed to the profile settings page and modify his/her name in his/her profile. Next, the identity broker system 106 sends the name and social security number or identification number to a third party and receives confirmation of a match. Upon receiving confirmation of a successful match, the user is sent a verifying e-mail and a "verified" label is applied to user's profile.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims of this application. As will be understood by those familiar with the art, the embodiments may take other specific forms without departing from the spirit or essential characteristics thereof. Likewise, the particular naming and division of the modules, routines, features, attributes, methodologies and other aspects are not mandatory or significant, and the mechanisms that implement an embodiment or its features may have different names, divisions and/or formats. Furthermore, as will be apparent to one of ordinary skill in the relevant art, the modules, routines, features, attributes, methodologies and other aspects of the embodiments can be implemented as software, hardware, firmware or any combination of the three. Also, wherever a component, an example of which is a module, of the embodiments is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the embodiments are in no way limited to implementation in any specific programming language, or for any specific operating system or environment. Accordingly, the disclosure is intended to be illustrative, but not limiting, of the scope, which is set forth in the following claims.

The invention claimed is:

1. A computer implemented method for performing identity verification, the method comprising:
    receiving an identity verification request, the identity verification request including a selection of a type of identity verification, the type of identity verification specifying a method of verifying an identity of a user;
    generating and sending a time-limited unique identification code corresponding to a subset of information from a user profile that allows for identity verification of the user;
    receiving a request for user information associated with the unique identification code;
    sending the user information associated with the unique identification code;
    receiving a confirmation signal from a verifier system based on the received user information and the selection of the type of identity verification; and
    updating the user profile to reflect that the identity of the user has been verified.

2. The computer implemented method of claim 1, the method further comprising:
    sending a confirmation signal to a user computer indicating that the identity of the user has been verified.

3. The computer implemented method of claim 1, wherein sending the unique identification code corresponding to the user profile includes sending a location of one or more verifier systems.

4. The computer implemented method of claim 1, wherein sending the unique identification code corresponding to the user profile includes sending directions to one or more verifier systems.

5. The computer implemented method of claim 1, wherein sending the unique identification code corresponding to the user profile includes sending instruction for completing a verification process.

6. The computer implemented method of claim 1, wherein the request for user information is sent by the verifier system.

7. The computer implemented method of claim 1, wherein the verifier system is a computer network of a financial institution, bank, governmental office, or some other trusted set of businesses or notaries such as a wire transfer service.

8. The computer implemented method of claim 1, wherein the request for user information is received responsive to receiving information confirming that the user has presented the unique identification code to a clerk of the verifier system.

9. The computer implemented method of claim 1, wherein the user information includes one or more of the user's full name, address, citizenship, phone number, gender, and ID card number.

10. The computer implemented method of claim 1, wherein the confirmation signal from the verifier system is sent responsive to receiving information confirming that a clerk has verified that the user's identification matches the user information.

11. The computer implemented method of claim 10, wherein receiving information confirming that a clerk has verified that the user's identification matches the user information includes receiving information that the clerk physically inspected the user's government issued identification to verify the user's identity matches the user information.

12. The computer implemented method of claim 1, wherein updating a user profile to reflect that the identity of the user has been verified includes a visual indication of verification on the user profile.

13. The computer implemented method of claim 1, wherein the method of claim 1 is implemented in at least one tier of a multi-tiered identity verification system.

14. A system for performing identity verification, the system comprising:
    an identity broker server comprising a processor and instructions for generating and sending a time-limited unique identification code corresponding to a subset of information from a user profile that allows for identity verification of the user responsive to receiving an identity verification request, the identity verification request including a selection of a type of identity verification, the type of identity verification specifying a method of verifying an identity of a user, sending user information associated with the unique identification code responsive to receiving a request for user information associated with the unique identification code and updating the user profile to reflect that the identity of the user has been verified responsive to receiving a confirmation signal from a verifier system; and an identity verifier server comprising a processor and instructions for receiving user information associated with the unique identification code responsive to sending the request for user information associated with the unique identification code and sending the confirmation signal, the confirmation signal based on the received user information and the selection of the type of identity verification.

15. The system of claim 13, wherein the identity broker server further comprises instructions for sending a confirmation signal to a user computer indicating that the identity of the user has been verified.

16. The system of claim 13, wherein the identity broker server further comprises instructions for sending a location of one or more verifier systems with the unique identification code.

17. The system of claim 13, wherein the identity broker server further comprises instructions for sending directions to one or more verifier systems with the unique identification code.

18. The system of claim 13, wherein the identity broker server further comprises instructions for sending instructions for completing the verification process with the unique identification code.

19. The system of claim 13, wherein the verifier system is server belonging to a network of a financial institution, bank, governmental office, or some other trusted set of businesses or notaries such as a wire transfer service.

20. The system of claim 13, wherein the identity verifier server sends the request for user information responsive to the user presenting the unique identification code to a clerk.

21. The system of claim 13, wherein the user information includes one or more of the user's full name, address, citizenship, phone number, gender, and ID card number.

22. The system of claim 13, wherein the identity verifier server sends the confirmation signal responsive to receiving confirmation that a clerk has verified whether the user's identification matches the user information.

23. The system of claim 22, wherein the identity verifier server sending the confirmation signal responsive to receiving confirmation that a clerk has verified whether the user's identification matches the user information includes receiving confirmation that the clerk physically inspected the user's government issued identification to verify the user's identity matches the user information.

24. The system of claim 13, wherein the identity broker server includes a visual indication of verification on the user profile upon updating the user profile to reflect that the identity of the user has been verified.

* * * * *